March 26, 1957  A. L. JOHNSON  2,786,462
MECHANICAL PROPORTIONING DEVICE
Filed May 3, 1954  3 Sheets-Sheet 1
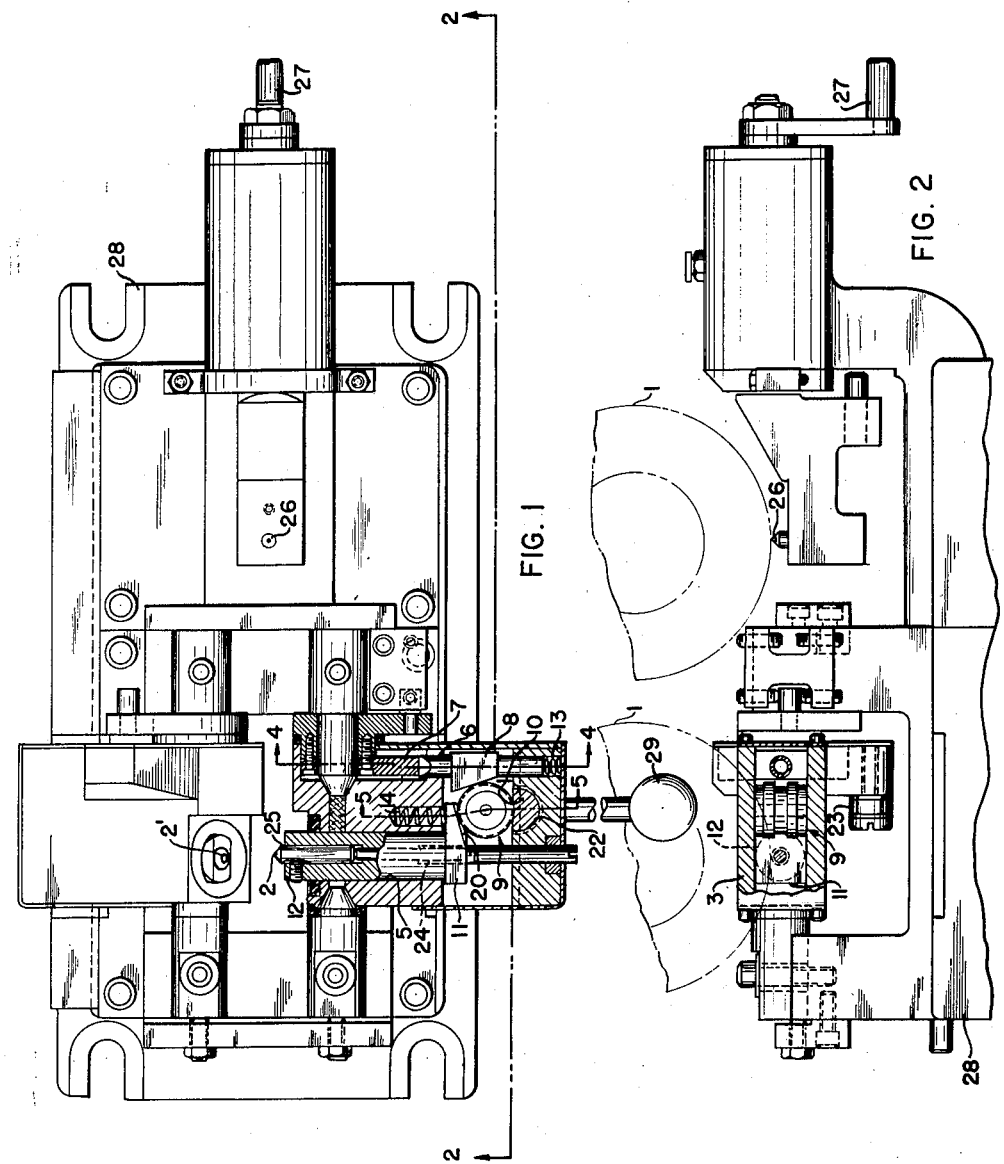
INVENTOR.
ARDEN L. JOHNSON
BY
ATTORNEYS March 26, 1957  A. L. JOHNSON  2,786,462
MECHANICAL PROPORTIONING DEVICE
Filed May 3, 1954  3 Sheets-Sheet 2

*INVENTOR.*
ARDEN L. JOHNSON
BY Pennie, Edmonds,
Morton, Barrows & Taylor
ATTORNEYS March 26, 1957 A. L. JOHNSON 2,786,462
MECHANICAL PROPORTIONING DEVICE
Filed May 3, 1954 3 Sheets-Sheet 3

INVENTOR.
ARDEN L. JOHNSON
ATTORNEYS

United States Patent Office 2,786,462
Patented Mar. 26, 1957

2,786,462

MECHANICAL PROPORTIONING DEVICE

Arden L. Johnson, Detroit, Mich., assignor to Vinco Corporation, Detroit, Mich., a corporation of Michigan Application May 3, 1954, Serial No. 427,194

9 Claims. (Cl. 125—11)

This invention relates generally to a mechanical proportioning device and more particularly to a device wherein the motion of a movable member is proportional to the motion of a cam follower.

The need for accurately proportioned mechanical movement exists in such devices as grinding wheel dressers, grinders and other machines wherein a moving member must accurately trace the shape of a master pattern or cam on a work piece but at different scale. Large master cams or patterns are used in machines wherein the piece to be worked on is comparatively small and on which complex shapes would be hard to accurately form. By use of a large master cam, the complex shape can be laid out more accurately as it will be on a larger scale. Any error in the shape from the theoretical perfect shape will be carried over to the work piece but such error will be proportionately reduced. Likewise, in some machines wherein the work piece is extremely large, it is some times more accurate to make a relatively small master pattern. This is especially true wherein the radii of the complex shaped work pieces are too large to conveniently lay out on a pattern of the same size as the work piece. It is thus seen that accurate linkage means must be provided between a cam follower and a moving member carrying a grinding wheel, dressing tool or other tracing device, if the moving member is to trace on the work the exact shape as traced by the cam follower on the master cam. It is therefore an object of this invention to provide for simple accurate linkage means between a cam follower and a moving member in order that motion of the moving member will accurately reproduce the shape traced by a cam follower but at an exact predetermined proportional ratio thereof.

It is a further object of the invention to provide in a mechanical proportioning device means wherein the ratio between the motion of the movable member as compared to the cam follower may be easily changed.

I propose to accomplish this by providing for one or more compound rollers made up of a plurality of rollers having different diameters and mounted for rotation about a common axis to be inserted between two ratio reducing cams having inclined sides which in turn are fixed to the cam follower and movable member. The compound roller is so positioned as to ride upon the inclined sides of both ratio reducing cams and on one or more flat surface members operatively interposed between the ratio reducing cams. Each roller of a compound roller is made to contact only one ratio reducing cam or one flat plane. By moving one ratio reducing cam, a compound roller, since it will also roll on a flat surface member, will force the other ratio reducing cam to move also but at a different degree than the ratio reducing cam which was moved in the first instance. The amount of movement of the ratio reducing cam moved is governed by the slope of the ratio reducing cams and by the angle which the flat surface member makes to the slopes of both ratio reducing cams. This in turn establishes the ratio between the movement of the cam follower and other movable member carrying the dressing tool, grinding wheel or other device which is to trace a desired shape upon a work piece.

In the drawings:

Fig. 1 shows a form of my invention as applied to a grinding wheel dresser;

Fig. 2 is a partial sectional view of Fig. 1 taken along line 2—2;

Figure 3:
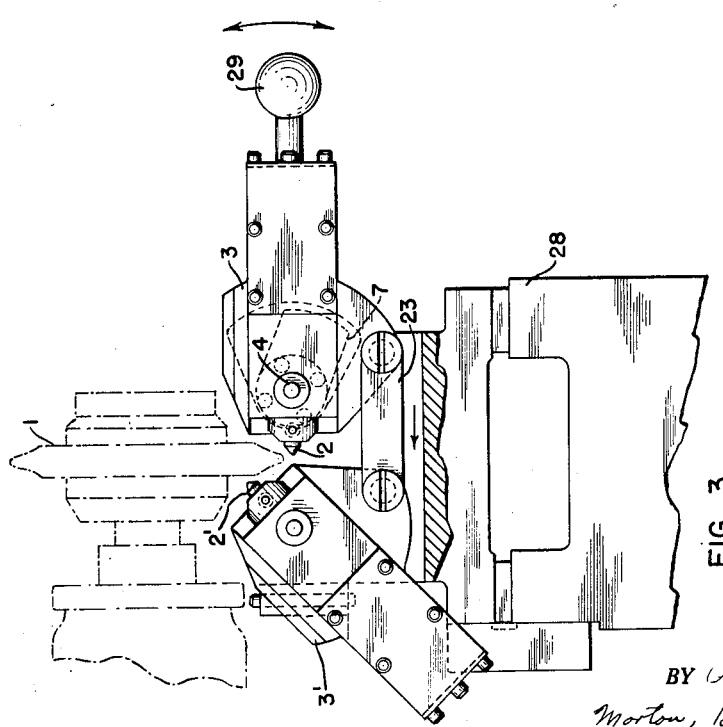
Fig. 3 is a side view of Fig. 1.

It is seen by reference to the drawings that 1 denotes a grinding wheel which is to be dressed on its outer periphery to a particular shape. The wheel shown in the drawings happens to be one on which it is desired to dress an involute curve on the outer face thereof rather than a curve consisting of an arc of a perfect circle. It is to be understood however, that the cut on the outer face of the wheel can be dressed in any shape desired and that the particular shape is only limited by the master cam or pattern used, as will be explained later. The dressing diamond 2, as shown in Fig. 3, must move in a path complementary to the shape to be dressed on the grinding wheel. This is done by mount of the diamond 2 in a tool holder 25 which in turn is slidably carried in a block 3 which is rotatable about point 4, see Fig. 3, and by adaption of the diamond to slide longitudinally in bore 5 of the block. The force for causing the sliding movement of the diamond in the bore is derived from a cam follower 6 moving over a cam 7. The cam follower is attached to or made integral with a ratio reducing cam 8 having an inclined side which in turn contacts on its inclined side a compound roller 9. As best seen in Fig. 1, when cam follower 6 moves up and down, it will cause compound roller 9 to move along flat surface member 10 and thus cause ratio reducing cam 11 to move up and down. Ratio reducing cam 11 is attached to or made integral with movable member 12 which is free to slide in bore 5 of block 3 and which carries the diamond tool 25. Spring 13 is provided to continually force the master cam follower in contact with the master cam and spring 14 is provided so that ratio reducing cam 11 will be in continuous contact with compound roller 9. Screw means 24 are provided so that the diamond tool 25 may be adjustably positioned relative to movable member 12.

Figure 4:
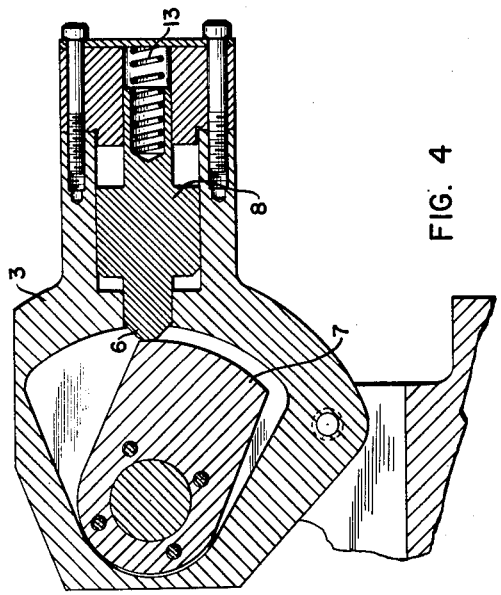
Fig. 4 is an enlarged sectional view taken along line 4—4 of Fig. 1 showing in detail the contact of the cam follower with the cam.
Figure 5:
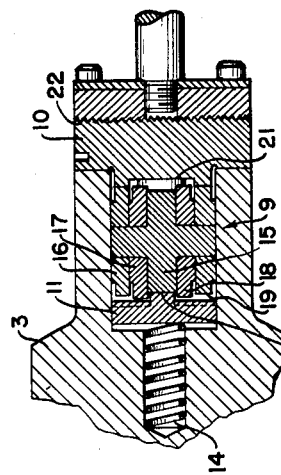
Fig. 5 is an enlarged sectional view of Fig. 1 taken along line 5—5 showing in detail the construction of the compound roller and its contact with one of the ratio reducing cams and the flat surface member.

As best seen in Fig. 5, compound roller 9 is made up of five separate rollers mounted for rotation about a common axis which in this form is a pair of trunnions integral with center roller 15. It is to be understood however, that center roller 15 could be made rotatable about a separate axle in the same manner as rollers 16 through 19 are rotatable about the axle shown. Center roller 15 has the smallest diameter of any of the rollers in the compound roller and only contacts ratio reducing cam 11 on ridge 20. Rollers 16 through 19 protrude on either side of ridge 20 but do not contact the cam 11 itself. Rollers 16 and 19 are of equal diameter and are of greater diameter than roller 15. They contact only flat surface member 10. Flat surface member 10 is cut out as at 21 shown in Fig. 5, so that rollers 17 and 18 will not contact it. Rollers 17 and 18 are of equal diameter and have a larger diameter than rollers 16 and 19. They contact only ratio reducing cam 8 which is attached to or made integral with the cam follower. It is thus seen that each of the individual rollers only contacts one ratio reducing cams or one flat surface member, so that when the common axis moves, there will be no sliding movement of any of the rollers over any cam or flat surface member and that there will be only a true rolling movement over the cams and the surface members contacted by each roller.

The ratio reducing cams 11 and 8 in the particular embodiment shown are so designed that each gives a 4 to 1 ratio. That is as ratio reducing cam 8 is moved 4 units down, it will cause compound roller 9 to move 1 unit sideways. This in turn will cause ratio reducing cam 11 to move ¼ unit upwards so that the ratio for the complete device in this case is 16 to 1. The angle of slope "A" for the ratio reducing cams will then be 14° 2′ 4″ where tan "A" equals ¼. It is obvious however, that any angle can be used giving any ratio desired so that the ratio of the device as a whole could be easily changed by insertion of ratio reducing cams having different slope angles than that shown. It is obvious also that instead of having a proportioning unit wherein the ratio of movement of the movable member to the cam follower is decreased, it would be possible to have the ratio increase by one's making the movable member, as shown, the cam follower, and letting the cam follower, as shown, carry the dressing tool or other working device.

I provide however, for a much simpler means for changing the ratio of the proportioning unit. This is done simply by one's making flat surface member 10 rotatable about its center in bore 22 so that its inclination to the ratio reducing cams is varied. Thus, it is seen by reference to Fig. 1, that by rotation of flat surface member 10 in a clockwise direction, the ratio of the unit is effectively reduced so that ratio reducing cam 11 will move up further for a given deflection of ratio reducing cam 8 than when flat surface member 10 is horizontal. If the flat surface member 10 is turned in a counter-clockwise direction, the ratio will be increased so that ratio reducing cam 11 will move up a less distance for a given deflection of ratio reducing cam 8 than when flat surface member 10 is horizontal. If the flat surface member 10 is turned counterclockwise to equal the angle of slope of ratio reducing cam 11, then it is seen that ratio reducing cam 11 will not move for any deflection of ratio reducing cam 8. Indicator means could be put on the outside of block 3 and attached to flat surface member 10 to show the resulting ratio of the proportioning unit when the flat surface member 10 is rotated.

In Fig. 3 it is seen that both sides of the grinding wheel are dressed at once upon rotation of block 3. Handle 29 is provided so that block 3 may be manually rotated about point 4. Link 23 connects block 3′ to block 3. Block 3′ and the proportioning movement device therein are similar in all details to block 3 and its proportioning movement device, except that the master cam in block 3′ is inserted backwards to that in block 3. This is because, as seen in Fig. 3, the diamond 2 is dressing the bottom part of the cut on wheel 1, while diamond 2′ is dressing the upper part of the cut and that as block 3 is rotated, the cutting diamonds swing in arcs until they pass each other. Of course, different shape master cams could be inserted in the blocks as desired so that the cut produced on the wheel would not be symmetrical.

The grinding wheel dresser as shown, is further provided with a third cutting diamond 24 for truing that part of the outer tip periphery of the wheel that is not trued by diamonds 2 and 2′. This diamond is caused to travel in a circular arc across the wheel face by turning of crank 27. The whole dressing unit is set in a heavy frame 28 which in turn is slidable along the work table of the machine supporting the grinding wheel.

Figure 6:
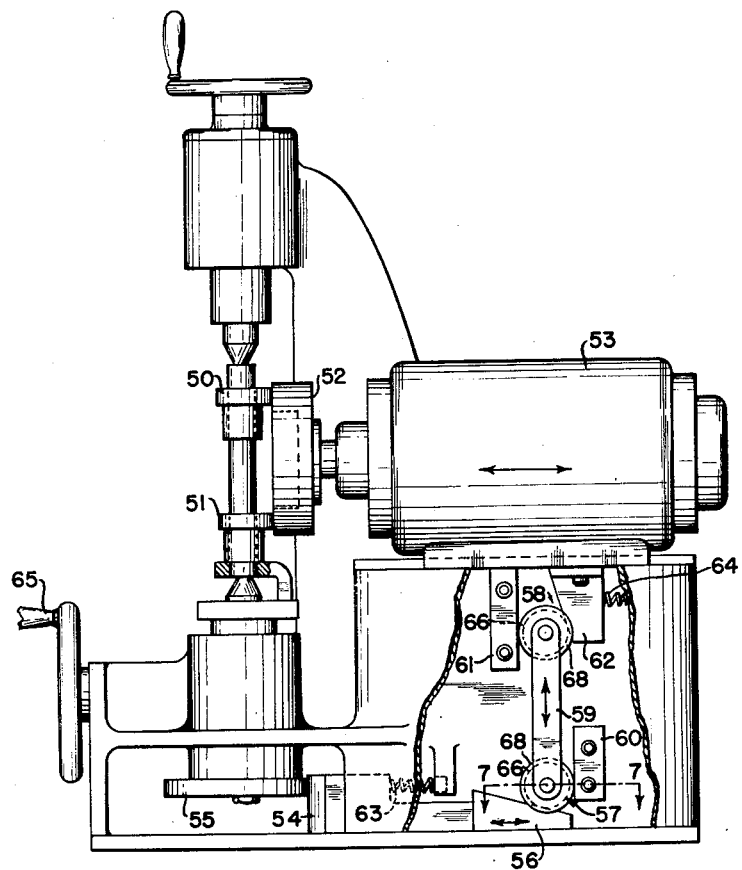
Fig. 6 is a modified form of my invention shown used in a grinding machine.
Figure 7:
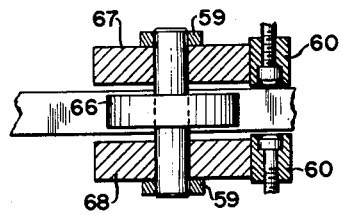
Fig. 7 is a sectional view of Fig. 6 taken along line 7—7.

In Figures 6 and 7 a modified form of the invention is shown as applied to a grinder for grinding complex shapes on the work pieces wherein a large master cam serves as a pattern. Here the work pieces 50 and 51 are ground by wheel 52 which is driven by a motor 53. The wheel and motor are slidable transversely of the work in order to vary the depth of cut or grind by the grinding wheel on the work. This movement is controlled by the engagement of the cam follower 54 to a master cam 55. The cam follower 54 is attached to or made integral with a ratio reducing cam 56 which engages a compound roller 57 which in turn engages flat surface member 60. Compound roller 57 is attached to another compound roller 58 by means of a link 59. Roller 58 engages ratio reducing cam 62 and flat surface member 61. Ratio reducing cam 62 is connected to motor 53 so that when ratio reducing cam 56 is forced in one direction by the action of the cam follower on the cam, the motor and wheel 52 will move in the same direction. Spring 63 is positioned so as to force the cam follower into continual engagement with the cam and spring 64 is positioned so that ratio reducing cam 62 is forced into continuous contact with roller 58. Master cam 55 is mounted coaxially with the work pieces so that when the cam is rotated by lever 65 the work pieces will rotate in unison therewith.

Compound rollers 57 and 58, which are similar, differ from the compound roller of the invention only in that they have three rollers instead of five and that there are two different diameters instead of three. The small center roller 66 contacts only wedge 56 while larger rollers 67 and 68 contact only the flat plane 60. It is thus seen that as in the other embodiment of the invention, that one individual roller of the compound roller only contacts one ratio reducing cam or one flat surface member so that as the common axis moves, there will be no sliding movement of a wheel over the ratio reducing cams and surface members but only a true rolling movement.

Similarly as in the other form of the invention, the ratio of the device can be changed by change of the angle of both ratio reducing cams, or by change of the angle the plane member makes with the ratio reducing cams. In this form both flat surface members would have to be turned equally in order that their flat surfaces in engagement with the rollers were always parallel if the ratio were to be changed.

While I have shown one form of my proportioning device as applied to a wheel dresser and another form as applied to a grinder, it is to be understod that both forms are interchangeable and the proportioning device could be used on other devices besides grinders or wheel dressers.

I claim:

1. A mechanical proportioning device comprising, a movable member, a first ratio reducing cam fixed to said movable member, a master cam follower, a second ratio reducing cam fixed to said master cam follower, a compound roller comprising a plurality of rollers mounted for independent rotation about a common axis, and a flat surface member operatively positioned between said first and second ratio reducing cams and extending in a direction intersecting the direction of movement of said movable member; said first and second ratio reducing cams and said flat surface member being each engaged by different individual rollers of said compound roller.

2. A mechanical proportioning device according to claim 1 wherein said flat surface member is rotatable with respect to said ratio reducing cams in order to vary the ratio of movement between said cam follower and said movable member.

3. A mechanical proportioning device for imparting proportional movement between a master cam follower and a movable member comprising in combination, a first ratio reducing cam having an inclined side and fixed to said movable member, a second ratio reducing cam having an inclined side fixed to said master cam follower, a flat surface member extending in a direction intersecting the direction of movement of said movable member, a master cam, a compound roller comprising a first, second, third, fourth and fifth rollers mounted for independent rotation about a common axis, said first and fifth rollers being equal in diameter but of different diameter than said second, third and fourth rollers, and said second and fourth rollers being of equal diameter but of different diameter than said third roller; said first ratio reducing cam engaging on its inclined side said third roller, said second ratio reducing cam engaging on its inclined side said second and fourth rollers, and said flat surface member engaging said first and fifth rollers.

4. A device according to claim 3 wherein said flat surface member is rotatable with respect to said first and second ratio reducing cams to vary the ratio of movement between said cam follower and said movable member.

5. A device according to claim 3 having in addition first and second spring means, said first spring means biasing said first ratio reducing cam to continually engage said third roller and said second spring means biasing said second ratio reducing cam to force said master cam follower in continual engagement with said master cam.

6. A grinding wheel dresser having a dressing diamond, a rotatable block with said dressing diamond slidably mounted therein, means for rotating said block, a master cam, a master cam follower engaging said master cam, and mechanical proportioning means for sliding said dressing diamond in said block in response to rotation of said block by said rotating means and in response to engagement of said master cam follower with said master cam, comprising a first ratio reducing cam fixed to said dressing diamond, a compound roller having a plurality of rollers of different diameter mounted for independent rotation about a common axis, a second ratio reducing cam fixed to said cam follower, and a flat surface member operatively positioned between said ratio reducing cams; said first ratio reducing cam engaging one roller of said compound roller, said second ratio reducing cam engaging a different roller of said compound roller than said first ratio reducing cam and said flat surface member engaging a different roller of said compound roller than said first and said second ratio reducing cams.

7. A grinding wheel dresser according to claim 6 wherein said flat surface member is rotatable to vary the ratio of movement between said master cam follower and said dressing diamond.

8. A mechanical proportioning device for imparting proportional movement between a master cam follower and a movable member comprising a first ratio reducing cam fixed to said master cam follower, a second ratio reducing cam fixed to said movable member, two compound rollers each having a plurality of rollers of different diameter mounted for independent rotation about a common axis, a link connecting the two compound rollers, and two flat surface members operatively positioned between said ratio reducing cams and extending in a direction intersecting the direction of movement of said movable member; each of said ratio reducing cams engaging one of said compound rollers and each of said flat surface members engaging one of said compound rollers, and each roller of each compound roller engaging not more than one ratio reducing cam or one flat surface member.

9. A mechanical proportioning device for imparting proportional movement between a master cam follower and a movable member comprising in combination, a first ratio reducing cam fixed to said movable member, a second ratio reducing cam fixed to said master cam follower, a compound roller having a plurality of rollers of different diameters mounted for independent rotation about a common axis operatively positioned between said first and second ratio reducing cams, and a surface member operatively positioned between said ratio reducing cams and extending in a direction intersecting the direction of movement of said movable member, said ratio reducing cams and a surface member each engaging a compound roller and the individual rollers of a compound roller each engaging not more than one ratio reducing cam or one flat surface member.

References Cited in the file of this patent

UNITED STATES PATENTS

| | | |
|---|---|---|
| 1,900,943 | Miller | Mar. 14, 1933 |
| 2,344,322 | Turrettini | Mar. 14, 1944 |
| 2,481,648 | Dehn | Sept. 13, 1949 |
| 2,658,496 | Hoglund | Nov. 10, 1953 |

FOREIGN PATENTS

| | | |
|---|---|---|
| 280,487 | Great Britain | Mar. 8, 1928 |